United States Patent [19]
Wefers et al.

[11] Patent Number: 5,682,262
[45] Date of Patent: Oct. 28, 1997

[54] METHOD AND DEVICE FOR GENERATING SPATIALLY AND TEMPORALLY SHAPED OPTICAL WAVEFORMS

[75] Inventors: Marc M. Wefers, Waltham; Keith A. Nelson, Newton, both of Mass.

[73] Assignee: Massachusetts Institute of Technology, Cambridge, Mass.

[21] Appl. No.: 571,523

[22] Filed: Dec. 13, 1995

[51] Int. Cl.$^6$ ..................................................... G02F 1/33
[52] U.S. Cl. .................. 359/305; 359/308; 359/310; 359/563; 359/566; 359/559; 359/154; 349/1
[58] Field of Search ............................ 359/305, 308, 359/310, 36, 91, 559, 563, 566, 306, 154; 349/1, 148, 132

[56] References Cited

U.S. PATENT DOCUMENTS

| | | | |
|---|---|---|---|
| 4,389,092 | 6/1983 | Tamura | 359/559 |
| 4,577,932 | 3/1986 | Gelbart | 359/305 |
| 4,655,547 | 4/1987 | Heritage et al. | 359/563 |
| 4,848,877 | 7/1989 | Miller | 349/184 |
| 4,928,316 | 5/1990 | Heritage et al. | 359/154 |
| 5,132,824 | 7/1992 | Patel et al. | 349/1 |
| 5,173,790 | 12/1992 | Montgomery | 359/306 |
| 5,187,598 | 2/1993 | Posluszny et al. | 359/559 |
| 5,363,221 | 11/1994 | Sutton et al. | 359/305 |

OTHER PUBLICATIONS

Hill et al., "Pulsed-Image Generation and Detection", Optics Letters 20:1201–1203, 1995.
Nuss, "Time-Domain Images", Optics Letters 20:740–742, 1995.
Wefers et al., "Programmable Phase and Amplitude Femtosecond Pulse Shaping", Optics Letters 18:2032–2034, 1993.
Wefers et al., "Ultrafast Optical Waveforms", Science 262:1380–1382, 1993.
Wefers et al., "Programmable Femtosecond-Pulse Shaping and Spectroscopy", Ultrafast Phenomena IX 60:39–41, 1994.
Wefers et al., "Programmable femtosecond multiple pulse generation and spectroscopy", Ultrafast Phenomena Topical Meeting, MG4, pp. 39–41, May 2–6, 1994.
Wefers et al., "Automated femtosecond pulse shaping and multiple-pulse femtosecond spectroscopy", OSA Annual Meeting Program, WCC2, 1994.
Wefers et al., "Generation of High-Fidelity Programmable Ultrafast Optical Waveforms", Optics Letters 20:1047–1049, 1995.

Primary Examiner—Loha Ben
Attorney, Agent, or Firm—Fish & Richardson P.C.

[57] ABSTRACT

A method and device for shaping both the temporal and spatial profiles of an input optical pulse to generate an output optical waveform are described. The method includes the step of dispersing the spectral frequencies of the input pulse. These frequencies are then focused with a cylindrical lens to form a two-dimensional optical field. The field is imaged on a mask featuring a two-dimensional array of pixels. The amplitudes, phases, or phases and amplitudes of the two-dimensional optical field are then filtered with the mask. The filtered spectral frequencies are then recombined to form the collective temporal profile of the output waveform. The two-dimensional optical field is then imaged in a sample plane to form the spatially coherent regions.

21 Claims, 5 Drawing Sheets

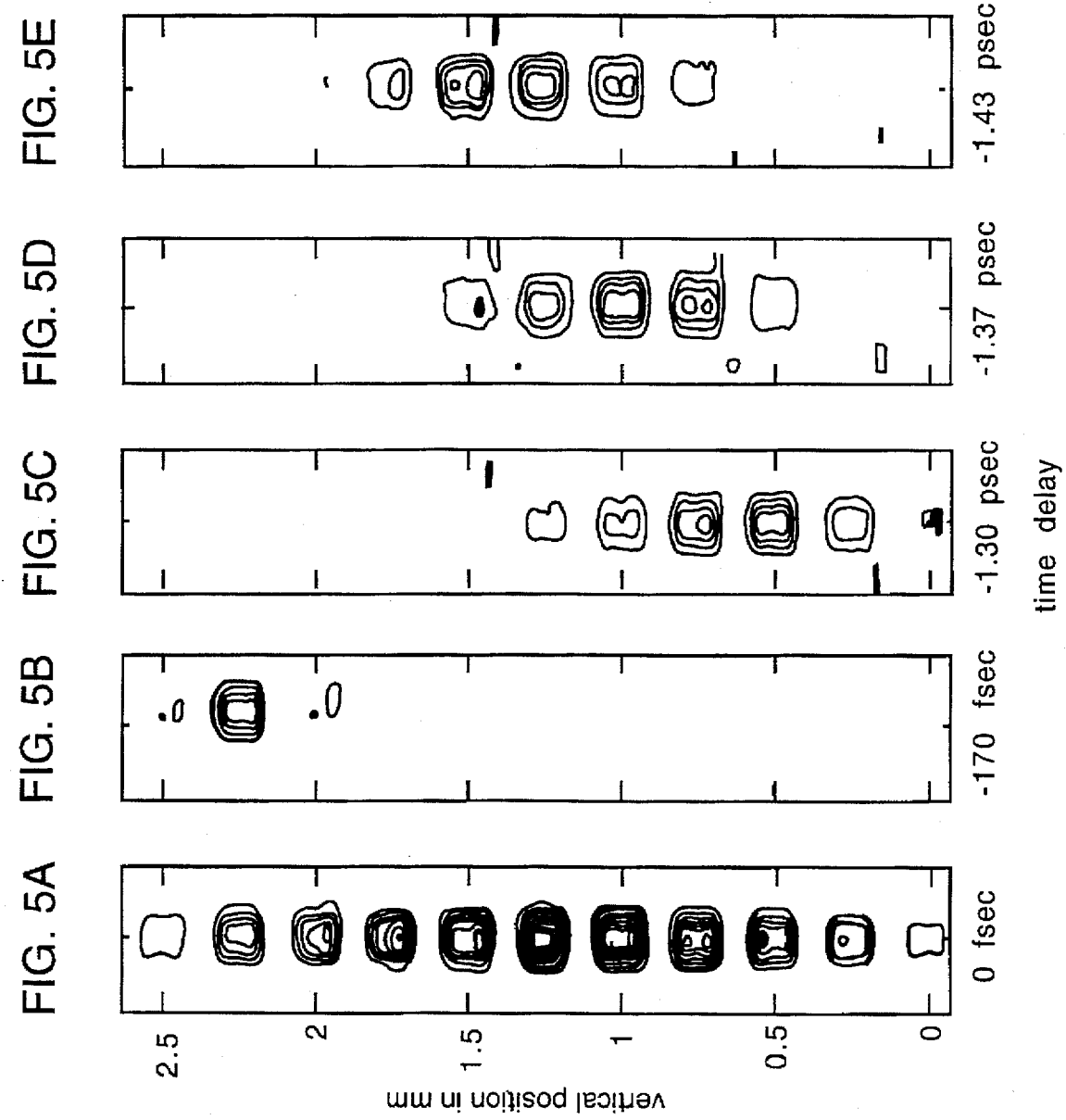

METHOD AND DEVICE FOR GENERATING SPATIALLY AND TEMPORALLY SHAPED OPTICAL WAVEFORMS

This invention was made with government support under grant Number CHE9404548 awarded by the National Science Foundation. The government has certain rights in the invention.

BACKGROUND

This invention relates to optical pulse shaping.

Single optical pulses can be "shaped" into optical pulse sequences which have complex temporal profiles. Pulses with durations on the order of $100 \times 15^{-15}$ s (100 fs), i.e. "ultrafast" pulses, are shaped by first spatially dispersing the pulse's spectral frequencies. The phases and/or amplitudes of the dispersed spectral frequencies are then filtered and recombined. This results in a pulse sequence having a temporal profile which is related to the Fourier transform of the filtered spectral frequencies.

As an example, a 100-fs pulse having a spectral bandwidth of about 8 nm can be shaped into a pulse sequence featuring multiple phase-coherent pulses, each having a different amplitude, timing, and frequency distribution. Pulse sequences with more complex temporal profiles are generated by filtering the spectral frequencies' phases and amplitudes accordingly. Input pulse sequences can also be shaped into single pulses, or into still other pulse sequences.

Conventional optical systems for pulse shaping have been described previously, for example, by Heritage et al., U.S. Pat. No. 4,655,547, and by Wefers et al. in Optics Letters, Vol. 20, p. 1047 (1995). These systems include a first diffraction grating for spatially dispersing the frequencies of the input pulse. Frequencies are dispersed in an elongated, elliptical frequency profile orthogonal to the axis of the pulse's propagation. This profile is collimated and focussed by a first spherical lens onto a pulse-shaping mask. A liquid-crystal (LC) spatial light modulator (SLM) featuring a one-dimensional pixel array is typically used as the mask. The mask filters the both the phases and amplitudes of the frequencies in the frequency profile. A subsequent spherical lens and grating recombine the filtered frequencies to yield the pulse sequence.

While effective in shaping the temporal profile of the input pulse, conventional optical systems have not been used to shape the pulse's spatial profile. In fact, the spatial profiles of the input pulse and output pulse sequence are nearly identical; both are typically smooth and gaussian in shape.

SUMMARY

Accordingly, the invention provides a method and device for shaping both the temporal and spatial profiles of an input optical pulse to generate an output optical waveform. The output waveform features multiple spatially coherent regions, each having a separate temporal profile.

In general, in one aspect, the method features the step of dispersing the spectral frequencies of the input optical pulse along a first axis to form a spectral frequency profile. The spectral frequency profile is then focussed, typically along a second axis orthogonal to the first axis, in an image plane to form a two-dimensional optical field including both phase and amplitude components. At least one of the amplitude, phase, or phase and amplitude components of the two-dimensional optical field is filtered with a mask comprising a two-dimensional array of pixels. The dispersed spectral frequencies are then recombined. The filtered two-dimensional optical field is then imaged to generate the time-dependent output optical waveform.

The focussing step can include focussing the spectral frequencies of the spectral frequency profile with a cylindrical lens. The mask can be reflective or transparent, and typically includes an optical element, such as a liquid crystal, for filtering the amplitude and/or phase components of the two-dimensional optical field. The recombining step can include using a second lens to image the filtered optical field on a diffraction grating, and then diffracting the filtered optical field.

A pattern can also be imparted on the optical field. In this case, the imaging step can include imaging the filtered two-dimensional optical field so that its spatial profile is an image of the pattern. Here, the imaging step includes collecting the filtered optical field with a third lens, and then imaging the optical field in a sample plane located one focal length away from the lens. The imaging step can also include imaging the filtered two-dimensional optical field so that its spatial profile is a Fourier transform of the pattern. Here, the field is imaged in a sample plane located two focal lengths away from the lens.

The optical waveform made using this method features multiple regions, where each region is spatially isolated, spatially coherent with other regions in the waveform, and includes a separate temporal profile comprising at least one time-dependent pulse. The duration of the pulse is typically $1 \times 10^{-12}$ second or less.

The invention has many advantages. For example, the output waveform can be shaped to include multiple, spatially distinct and coherent regions, each having a unique temporal profile conventional optical systems for pulse shaping only produce an optical beam having a single pulse sequence. Waveforms formed with the pulse-shaping device of the invention can be used in optical communications and signal processing systems. For example, the waveform can be shaped so that each region illuminates a separate address on an opto-electronic device; each address, in response, generates a separate electrical signal. The different regions of the waveform can also be coupled into separate optical fibers and used for communication systems.

Waveforms generated with the pulse-shaping device have spatial profiles which either match the pattern imparted by the mask on the optical field (i.e., "shadow imaging") or are the Fourier transform of the pattern (i.e., "Fourier imaging"). Both embodiments have advantages. In shadow imaging, the spatial resolution of the output waveform is directly related to the spatial resolution of the mask; simple spatial profiles are thus easily generated with low amounts of distortion. The spatial profile of the output waveform in shadow imaging is also easy to predict, as this profile is either a direct or inverted image of the pattern imparted on the optical field.

In Fourier imaging, the spatial profile of the output waveform is the Fourier transform of the pattern imparted by the mask on the optical field. In this embodiment, high spatial frequencies can be filtered and imaged to form the waveform's spatial profile. High-resolution spatial features, which are due to the high spatial frequencies, can thus be easily mapped onto the output waveform.

Either the shadow or Fourier imaging embodiment can be selected simply by changing the position of an imaging lens within the pulse-shaping device.

The pulse-shaping device can be constructed using commercially available, off-the-shelf optical components. The mask, for example, can be a two-dimensional LC SLM. Pulse-shaping devices featuring such a mask are computer controlled and have pixel configurations which can be rapidly changed (e.g., on the order of a millisecond). The temporal and spatial profiles of the output waveform can thus be changed in similarly short time periods.

Still other advantages of the invention will be apparent from the following detailed description, and from the claims.

DETAILED DESCRIPTION

Pulse-Shaping Device

Figure 1:
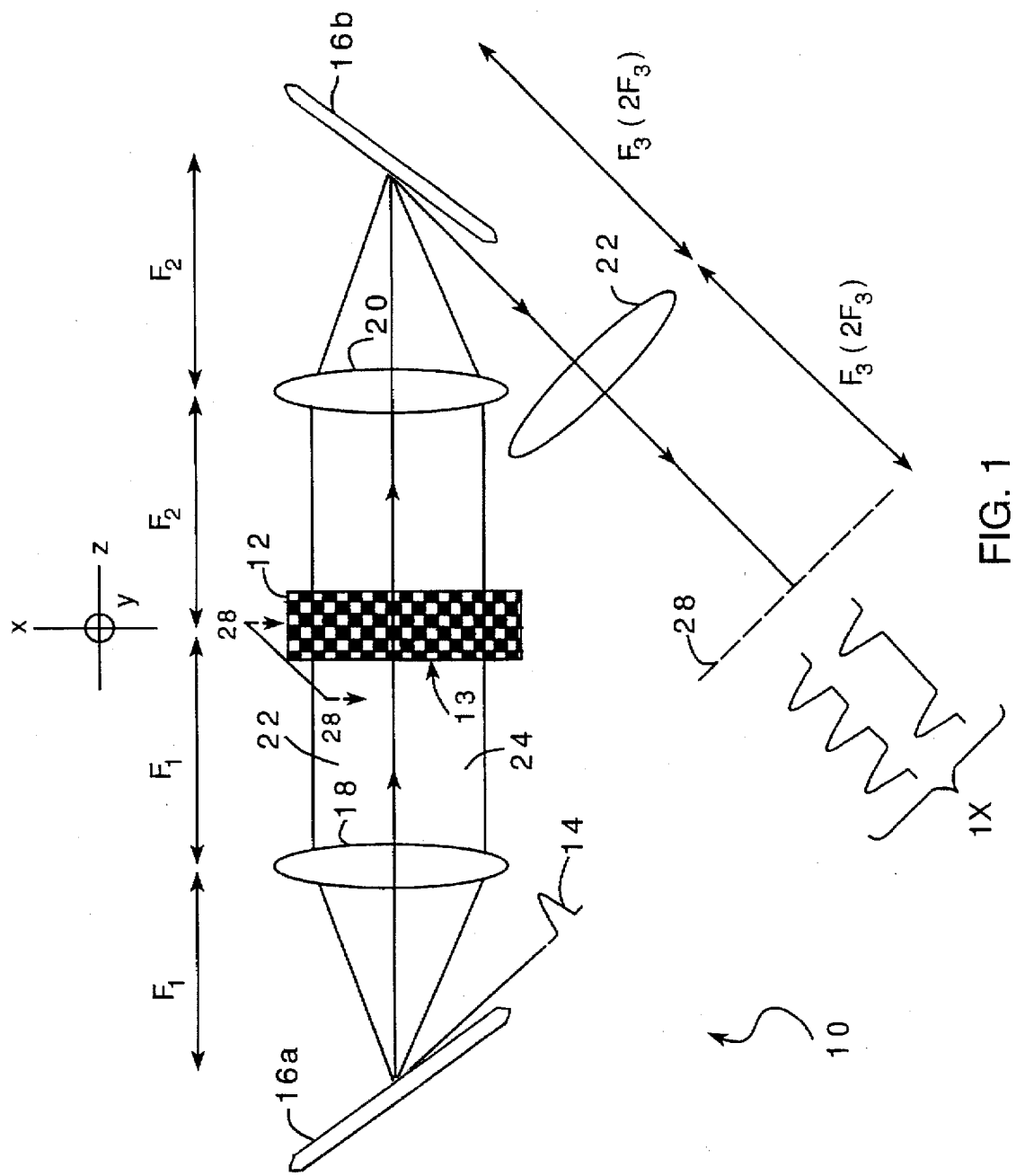
FIG. 1 is a schematic representation of the pulse-shaping device of the invention.

FIG. 1 shows a pulse-shaping device 10 for shaping an input optical pulse 14 into an output optical waveform 19. The waveform 19 is characterized by a two-dimensional spatial profile containing multiple spatially coherent regions, each of which has a temporal profile. A mask 12 controls both the temporal and spatial profiles of the output waveform. The mask 12 is a conventional liquid-crystal (LC) spatial light modulator (SLM) featuring a two-dimensional pixel array 13. The mask 12 is disposed between a pair of diffraction gratings 16a, 16b and a telescope including a cylindrical lens 18 and a spherical lens 20. A controller (not shown in the figure) adjusts the orientation of the liquid crystals within each pixel of the two-dimensional pixel array 13 to produce output waveforms with different temporal and spatial profiles.

Prior to entering the pulse-shaping device 10, the input pulse 14 is characterized by a set of phase-coherent, spatially overlapped spectral frequencies. After impinging the first diffraction grating 16a, the pulse is diffracted, causing its spectral frequencies to fan out along the x axis. The relatively high spectral frequencies of the pulse (i.e., the "blue" spectral frequencies) are dispersed to a region 23, while the relatively low spectral frequencies (i.e., the "red" spectral frequencies) are dispersed to a region 24.

The cylindrical lens 18 is positioned along the z axis between the first grating 16a and the mask 12. The cylindrical lens has a focal length $F_1$ and a curvature along the x axis. Both the first grating 16a and the mask 12 are displaced from the lens 18 by a distance $F_1$ along the z axis. The cylindrical lens collimates the individual, dispersed spectral frequencies along the x axis and concurrently focusses these frequencies as vertically extending lines along the y axis. The spectral frequency profile is thus imaged as a two-dimensional optical field on the face of the mask: ranges of spectral frequencies are spread along horizontal cross sections of the optical field, while each frequency in the range is constant along a vertical cross section.

Figure 2A:
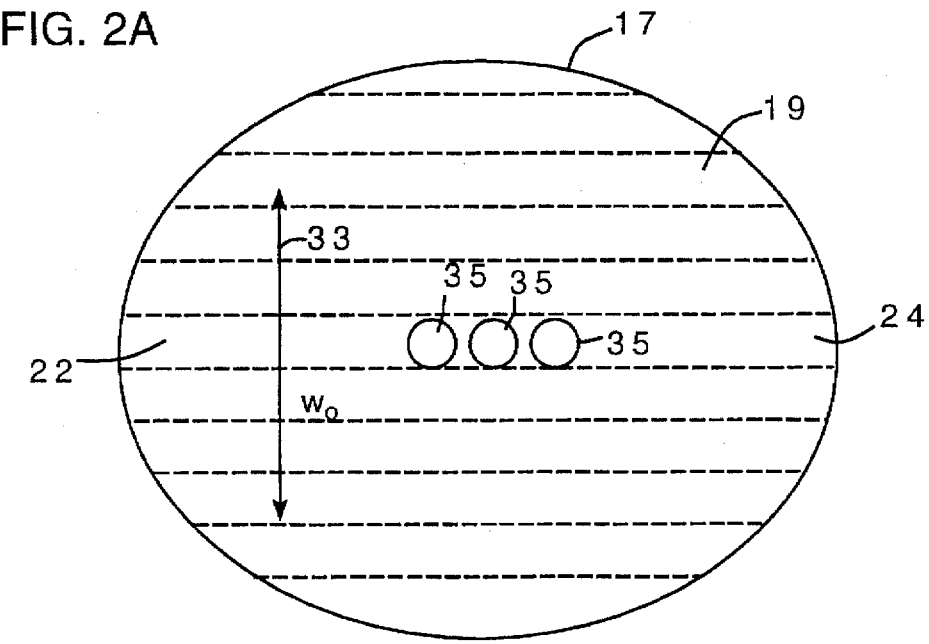
FIGS. 2A and 2B are front views of, respectively, an optical field in a mask plane resulting from the dispersed input pulse of FIG. 1, and the optical field incident on the pixel array of the mask of FIG. 1.
Figure 2B:
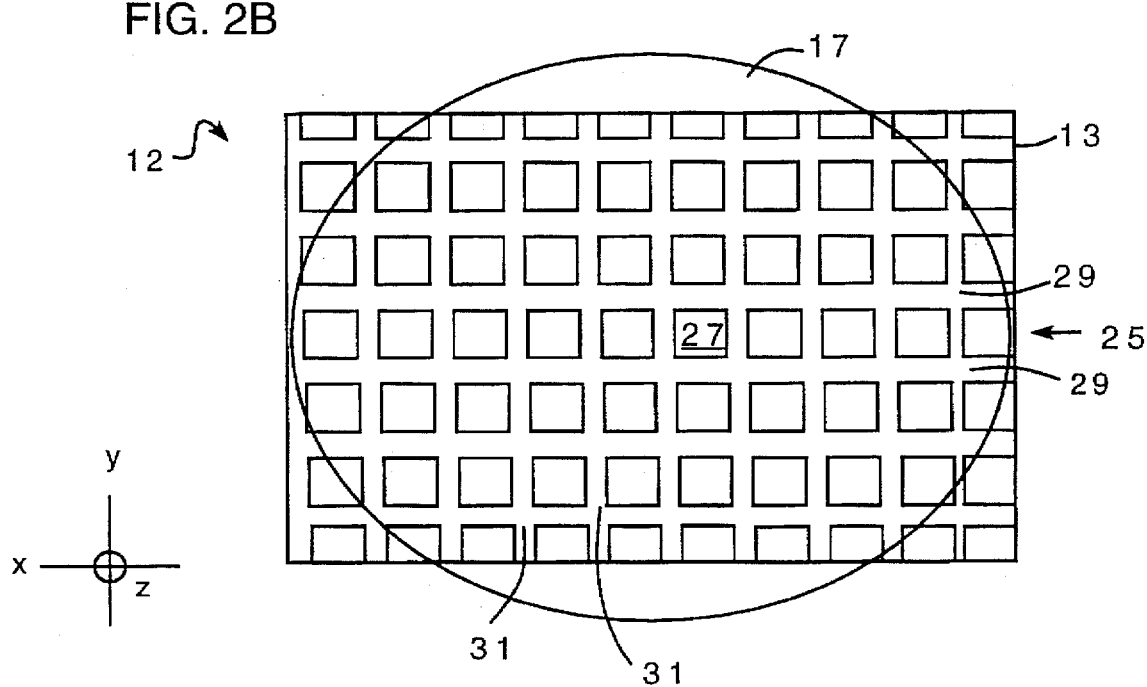

FIGS. 2A and 2B show schematic drawings of a two-dimensional optical field 17 which results from the spectrally dispersed and cylindrically focussed input pulse. The field 17 contains a series of adjacent horizontal sections 19, each composed of a range of the dispersed spectral frequencies. The set of frequencies within a range which pass through a single pixel 27 is indicated by the region 35. Each individual frequency is tightly focussed along the x axis and cylindrically focussed along the y axis, as indicated by the arrow 33 for the frequency $\omega_0$. In this case, high spectral frequencies are located on the left-hand side of the optical field (region 23); low spectral frequencies are located on the right hand side of the optical field (region 24).

FIG. 2B shows the two-dimensional optical field 17 imaged onto the two-dimensional pixel array 13 of the mask 12. The spatial dimensions of the mask 12 are chosen to match those of the optical field 17. A collection of individual pixels 27 is contained within the two-dimensional pixel array 13. The mask 12 is oriented so that horizontal, one-dimensional pixel arrays 25 within the two-dimensional array 13 are aligned along the x axis. The one-dimensional pixel arrays 25 are separated by horizontal gaps 29 within the two-dimensional pixel array; similar vertical gaps 31 separate neighboring pixels within each one-dimensional pixel array. The gaps are typically made as small as possible, as this minimizes "dead space" in the mask and maximizes the fraction of the optical field which can be filtered.

When imaged onto the mask, each of the horizontal sections 19 of the optical field 17 illuminates a different one-dimensional pixel array 25. The actual range of spectral frequencies which are sampled by any one pixel 27 in the one-dimensional pixel array will depend on the characteristics (i.e., spot size and pulse duration) of the input pulse, the size of each pixel, and how the input pulse is spectrally dispersed by the first diffraction grating and cylindrical lens.

Each portion 35 of the horizontal section 19 contains a set of spectral frequencies which are transmitted through a pixel in the two-dimensional pixel array. These spectral frequencies will have their phase retarded and/or their amplitude attenuated. The degree of retardation and attenuation depends of the alignment of the liquid crystals within each pixel. The collection of all the pixels in the two-dimensional pixel array 13 imparts a pattern onto the optical field which is related to retardation (i.e., phase) and/or attenuation (i.e., amplitude) of each portion 35.

Both the temporal and spatial profiles of the output waveform depend on this pattern. The pattern modifies the spectral profiles of all of the horizontal sections 19 of the field 17 passing through the one-dimensional pixel arrays 25. The time-domain Fourier transform of the modified spectral profiles yields the temporal profiles of the regions of the output waveform. In shadow imaging, the spatial profile of the output waveform is the exact or inverted image of the pattern.

In Fourier imaging, the desired waveform is produced by taking the vertical spatial Fourier transform of the spatial profile produced by shadow imaging. In contrast to shadow imaging, the temporal profile of a vertical position in the output waveform depends on more than a single one-dimension pixel array in the mask. This means that the two dimensions of the mask pattern, coupled together, produce the spatial and temporal profiles of the output waveform.

In this case, the vertical dimension of the mask filters the spatial frequencies that produce the spatial profile of the output waveform. As is well known in Fourier optics, a large range of spatial frequencies are necessary to produce features which are small and have sharp edges. Therefore, in Fourier imaging, a mask with a large aperture and an equally large incident optical field can produce an output waveform with fine spatial features.

Spatial and spectral filtering techniques used in the pulse-shaping device are well-known in the art. For example, E. G. Steward, "Fourier Optics: An Introduction" (Ellis Horwood Limited; 1987) describes the theory behind conventional spatial filtering of optical wavefronts. Optical phase retardation and amplitude attenuation using liquid crystals is described, for example, in Heritage et al., U.S. Pat. No. 4,655,547, and in Wefers et al., U.S. Ser. No. 08/438,822, the contents of both of which are incorporated herein by reference.

Referring again to the pulse-shaping device 10 of FIG. 1, the spherical lens 20 is positioned along the z axis so that its focal plane, spaced at a distance $F_2$, coincides with the focal plane (spaced at a distance $F_1$) of the first lens 18. The mask 12 is positioned where these two focal planes coincide (i.e., the mask plane). In this configuration, the lens pair forms a telescope around the mask along the x axis. The filtered optical field 17 exiting from the mask is collected by the lens 20 and imaged onto the second diffraction grating 16b. This grating 16b is positioned in the front focal plane, spaced at a distance $F_2$, of the spherical lens 20.

The filtered optical field is then diffracted by the grating 16b towards a second spherical lens 22. The lens 22 has a focal length $F_3$. The lens 22 and grating 16b recombine the spectral frequencies to yield the collective temporal profile of the output waveform. Each horizontal, one-dimensional pixel array of the mask forms a temporal profile for a different region (e.g., region 34 in FIG. 3) of the output waveform. Thus, the total number of different temporal profiles will correspond to the number of one-dimensional pixel arrays which are illuminated by the optical field.

The exact spatial profile of the output waveform depends on both the pattern imparted on the optical field 17 and the position of the second spherical lens 22 relative to the second diffraction grating 16b. The output waveform has a spatial profile which is either: i) a shadow image of the pattern; or ii) a Fourier image of the pattern.

Fourier imaging yields an output waveform in a sample plane 28 having a spatial profile which is the Fourier transform, taken along the y axis, of the pattern imparted on the optical field. In effect, Fourier imaging images the spatial profile existing immediately after the second diffraction grating 16b in the sample plane 28. As described above, this spatial profile is the Fourier transform of the pattern imparted on the optical field taken along the y axis.

Fourier imaging occurs when the spherical lens 22 is positioned at twice its focal length (i.e., $2F_3$) from the illuminated portion of the second diffraction grating 16b. Likewise, the sample plane 28 in Fourier imaging is located on the opposite side of the lens 22 at a distance of $2F_3$ from the lens.

In shadow imaging, the lens 22 is located at a single focal length (i.e., $F_3$) from the illuminated portion of the grating. The spatial profile is located in a sample plane displaced by a distance of $F_3$ on the opposing side of the lens 22. Spherical lenses 20 and 22 also form a telescope which can magnify or expand the regions in the waveform along the y axis. The degree of magnification or expansion depends on the magnification factor $M=F_3/F_2$. For example, the diameter of each region along the y axis will be the same as that of the optical field if the focal lengths of these lenses are equivalent (i.e., $F_2=F_3$; M=1). The diameter is decreased or increased if $F_2$ is greater than $F_3$ (i.e., M<1) or less than $F_3$ (i.e., M>1), respectively.

Figure 3:
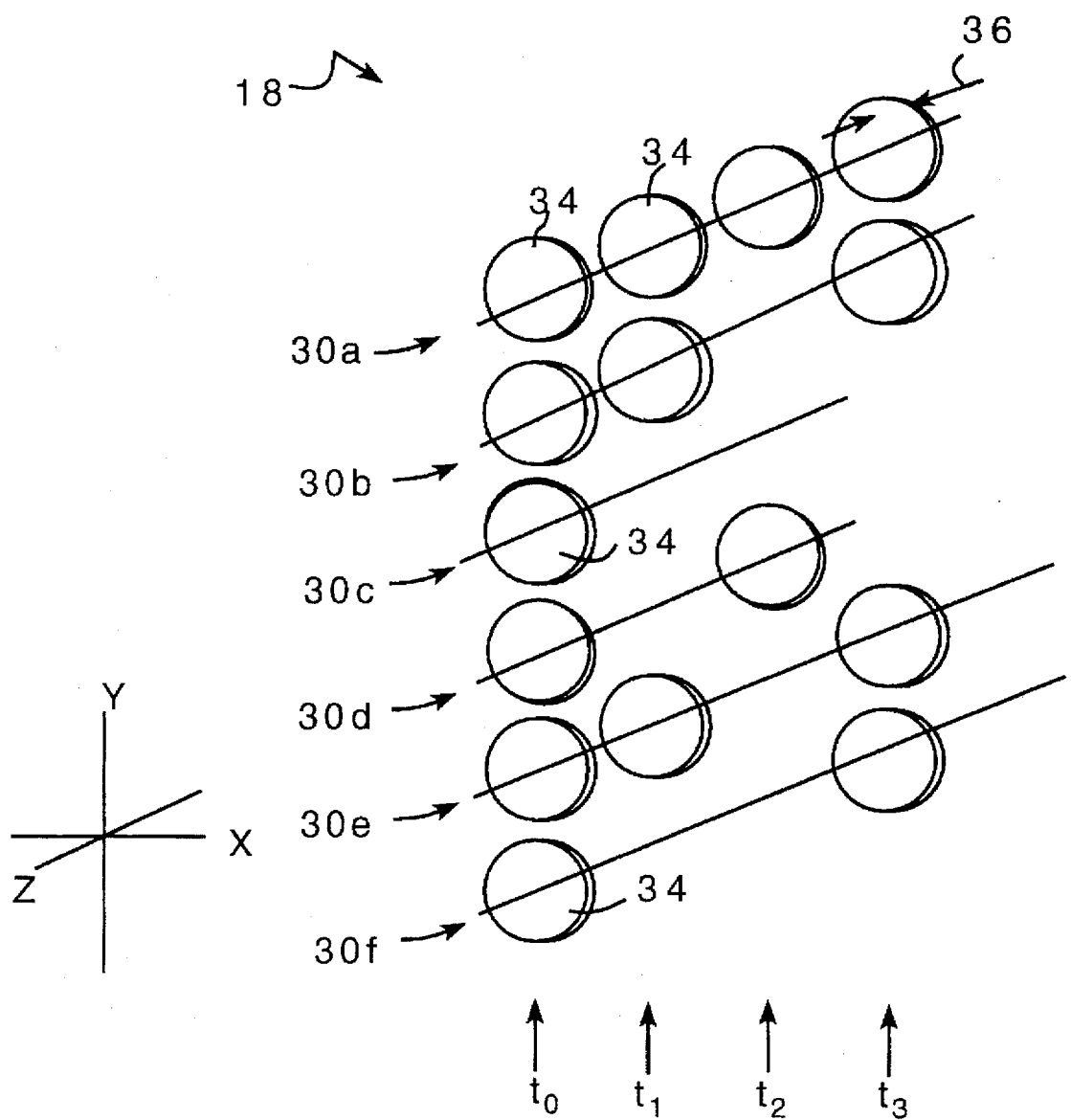
FIG. 3 is a three-dimensional view of an output waveform generated with the pulse-shaping device of FIG. 1.

FIG. 3 is a schematic drawing of a representative output waveform 19 shaped along the y axis by the pulse-shaping device of FIGS. 1 and 2B. The waveform is plotted in three dimensions, with the x and y axes equivalent to the x and y axes of the two-dimensional pixel array shown in FIG. 2B. The z axis is the same as that shown in FIG. 1, and additionally represents the temporal axis along which the output waveform propagates.

The output waveform 19 consists of multiple regions 30a–f, each having a temporal profile corresponding to a different horizontal, one-dimensional pixel array of the mask shown in FIG. 2B. The user-specified temporal profile of each region consists of a series of phase-coherent optical pulses 34. Each temporal profile includes a pulse 34 at zero time (i.e., $t=t_0$). The temporal profiles for regions 30a, 30b, 30d, 30e, and 30f each include at least one additional pulse at $t_1$, $t_2$, and/or $t_3$. Region 30c only includes the single pulse at $t_0$. The duration of each pulse, as indicated by the arrows 36 for the pulse at $t_3$ for the region 30a, depends on the mask and the bandwidth of the input pulse.

The regions 30a–f are spatially coherent with each other. The waveform shown in FIG. 3 is formed using the shadow imaging configuration of the pulse-shaping device. The mask used to form the waveform consisted of a series of one-dimensional pixel arrays, such as that shown in FIG. 2B. Each one-dimensional pixel array was separated from each other by a horizontal, opaque gap. The spherical lens after the grating is placed between the grating and the image plane and is separated from these elements by a single focal length. Thus, vertical separation between the regions 34 is due to the presence of the horizontal gaps separating the one-dimensional pixel arrays of the mask.

Mathematical Description of Spatial and Temporal Pulse Shaping

Both the temporal and spatial profiles of the output optical waveform can be described mathematically. Assume that the electric field corresponding to the input pulse is $e_{in}(t,y)$ and the mask filtering pattern is $m(x,y)$. The electric field $e_{out}(t,y)$ corresponding to the output waveform is given by:

$$e_{out}(t,y)=\int d\omega \exp(i\omega t)E_{in}(\omega,y)m(\alpha(\omega-\hat{\omega}),y) \qquad (1)$$

where $$E_{in}(\omega,y)=\int dt\exp(-i\omega t)\cdot e_{in}(t,y) \qquad (2)$$

The mask filtering pattern $m(x,y)$ can be expressed as $$m(x,y)=A(x,y)\exp(iP(x,y)) \qquad (3)$$

where $A(x,y)$ describes attenuation and is real, positive, and less than or equal to 1, and $P(x,y)$ varies between 0 and $2\pi$ and describes variation in optical thickness (i.e., retardation). This result ignores any magnification or reduction effects due to the presence of the telescopes in the pulse-shaping device. In equations 1 and 2, $\hat{\omega}$ is the angular frequency component imaged onto the center of the mask and $\alpha$ describes the spectral frequency dispersion along the x axis in the mask plane resulting from the first lens and grating. Equation 1 assumes perfect frequency resolution in the mask plane.

In Fourier imaging, the Fourier transform of the filtered optical field is imaged to form the spatial profile. The filtering function for the vertically dispersed spatial frequencies is now coupled, as described above, with the filtering function for the horizontally dispersed spectral frequencies.

As before, assuming perfect frequency resolution in the mask plane, the electric field $e_{out}(t,y)$ is thus given by:

$$e_{out}(t,y) = \iint dy' d\omega \exp\left(i\left(\omega t - \frac{2\pi y y'}{\lambda f}\right)\right) E_{in}(\omega,y')m(\alpha(\omega-\hat{\omega}),y') \quad (4)$$

where $\lambda$ is the center wavelength of the input optical pulse and f is the focal length of the spherical lens before the second grating. The analysis used above is entirely analogous to that used to describe conventional spatial Fourier filtering of wavefronts, with the exception that the horizontal dimension of the mask is used to filter horizontally dispersed spectral frequencies rather than horizontally dispersed spatial frequencies. 503

Other Embodiments

Figure 4:
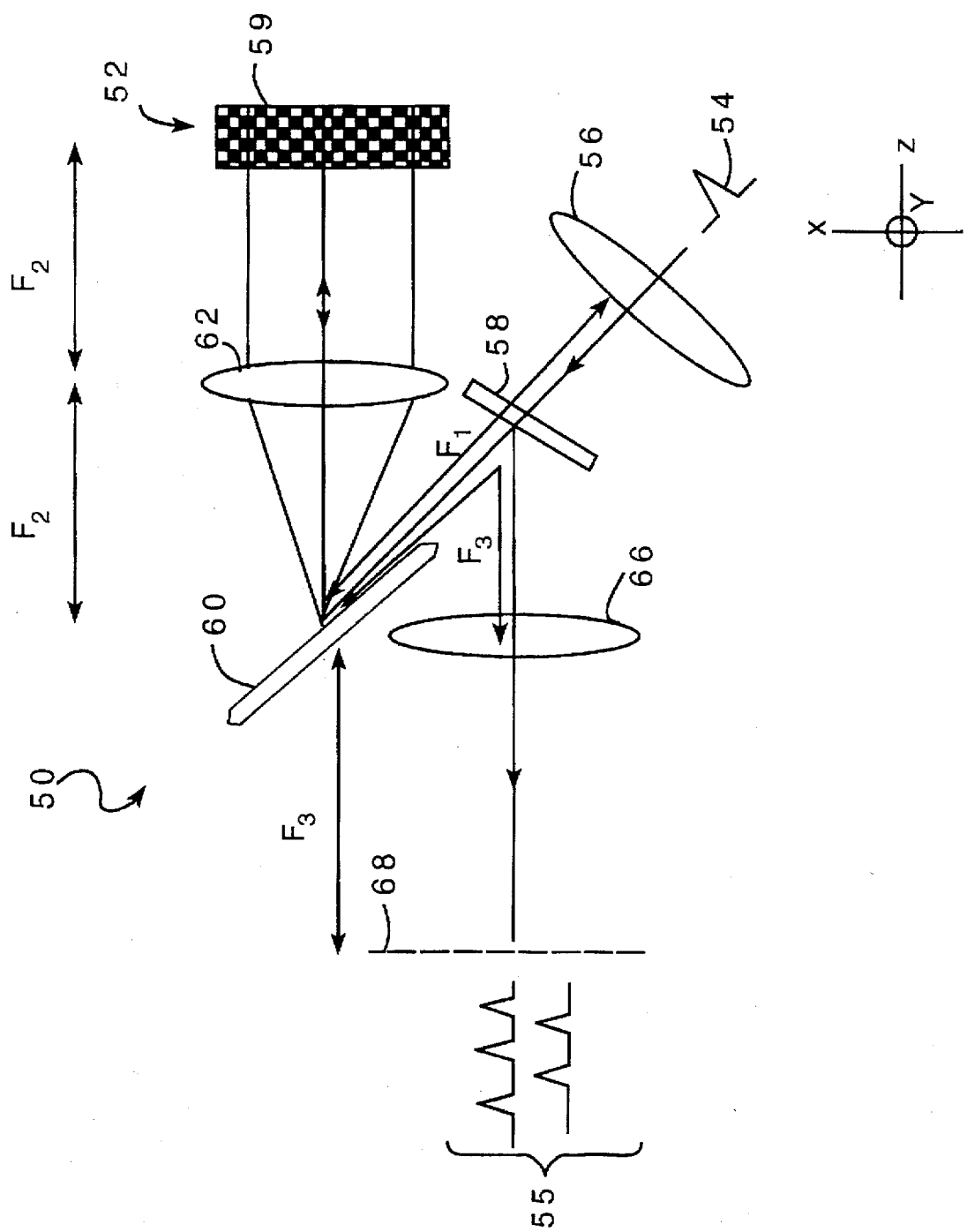
FIG. 4 is a schematic representation of a pulse-shaping device operating in a reflection mode; and, FIGS. 5A–5E are graphs showing the spatial profiles of a shaped waveform measured at time periods of, respectively, 0 fs, −170 fs, −1300 fs, −1370 fs, and −1430 fs.

Other embodiments are also within the scope of the invention. For example, FIG. 4 shows a pulse-shaping device 50 for forming a spatially and temporally shaped output optical waveform 55 from an incident optical pulse 54. In this case, the pulse-shaping device 50 features a mask 52 for filtering and then reflecting the spectral and spatial frequencies of the dispersed input optical pulse 54.

A cylindrical lens 56 having curvature along the y axis is disposed in front of a diffraction grating. The pulse passes through a partially transmitting beam-splitter 58 prior to impinging the grating. The cylindrical lens 56 focusses the spatial profile of the pulse as a horizontal line on the grating 60. The illuminated portion of the diffraction grating 60 is positioned in a plane displaced from the cylindrical lens 56 by the lens's focal length ($F_1$). Diffraction from the grating disperses the spectral frequencies of the pulse along the x axis. The diffracted field is collimated along the x and y axis with a first spherical lens 62, and individual frequency components are focussed as vertical lines on the mask, as described above for FIG. 1. The first spherical lens 62 is located between the grating 60 and the mask 52 at a distance of its focal length ($F_2$). This images a two-dimensional optical field, similar to that shown in FIG. 2A, onto the face of the mask 52.

The reflective mask shown in FIG. 4 features a two-dimensional pixel array and filters the incident optical field according to the description provided above. Horizontal, one-dimensional pixel arrays within the two-dimensional array are aligned along the x axis. Each horizontal section of the optical field illuminates a different one-dimensional pixel array. Electrical leads for biasing the individual pixels can be disposed on a back portion 59 of the reflective mask so that they have little or no effect on the incident optical field.

Once filtered, the optical field is reflected back towards the lens 62 and focussed onto the grating 60. The lens 62 and grating 60 recombine the filtered spectral frequencies to form the collective temporal profile of the output optical waveform.

A portion of the output waveform reflects off the partially transmitting beam-splitter 58 and is directed towards a spherical imaging lens 66. The spatial profile of the waveform is determined by the position of the lens 66. As before, both shadow and Fourier imaging are possible. Shadow imaging results when the lens 66 is displaced from the grating by a distance of $F_3$ along the propagation path, where $F_3$ is the focal length of the lens 66. The shadow image sample plane 68 is separated by a distance of $F_3$ from the lens 66. Fourier imaging results when both the grating/lens and lens/sample plane separation distances are $2F_3$.

Pulse-shaping devices employing other optical configurations are also within the scope of the invention. For example, different configurations of the spherical and cylindrical lenses can be used with the reflective and transmissive geometries of the pulse-shaping device. The optical configuration may also include lenses for shaping the spatial profile of the output waveform along the x axis. Reflective focussing mirrors can be used in place of transmissive focussing lenses. Similarly, other dispersive optical elements, such as prisms, can be used in place of the diffraction gratings.

Any two-dimensional mask for filtering the phase and/or amplitudes of the spatial and spectral frequencies can be used with the pulse-shaping device. More than one LC SLM can be combined to form the mask. LC SLMs used for the mask typically contain a thin (i.e., 5–20 µm) nematic liquid crystal layer sandwiched between two transparent silica substrates containing indium-tin oxide electrodes. The width and height of a single pixel in the two-dimensional pixel array are typically between about 90 and 100 microns, while the width of a gap is typically about 2–3 microns. The total mask aperture typically occupies an area which is roughly 1 cm×1 cm. LC SLMs which may be used with the invention are described in Miller, U.S. Pat. No. 4,848,877, Patel et al., U.S. Pat. No. 5,132,824, and Wefers et al., U.S. Ser. No. 08/438,822, the contents of which are incorporated herein by reference.

The masks can also be non-programmable glass or reflective plates selectively etched or patterned for amplitude and/or phase modulation.

The pulse-shaping device can be used to generate a wide range of temporally and spatially shaped optical waveforms. For example, while the waveform shown in FIG. 3 includes a series of separated regions, waveforms with connected, continuous regions can also be formed. This is typically done using Fourier imaging, rather than spatial imaging. As before, the regions of these waveforms are spatially coherent. The temporal profiles of each region in the waveform can be controlled individually.

The input pulse is typically an ultrafast pulse having a duration of 100 fs or less. Pulses having longer durations, or incoherent optical fields having broad spectral bandwidths, can also be used with the pulse-shaping device. The light source used to generate the pulses is typically a mode-locked laser, such as a Ti:Sapphire laser. Other light sources known in the art can also be used with the pulse-shaping device.

The experiments described in the following example are used to further illustrate the embodiments of the invention.

EXAMPLE

The pulse-shaping device used for these experiments was similar to that shown in FIG. 1. An 80-fs pulse having a wavelength of 788 nm from a 1-kHz Ti:Sapphire regenerative amplifier was used as the input pulse. The pulse was attenuated to about 10 microjoules and directed into the pulse-shaping device. A portion of the pulse was reflected by a 20% beam-splitter and used as a reference pulse for subsequent cross-correlation with the optical output waveform.

The pulse was incident on a diffraction grating (1200 lines/mm) at an angle of 45.25 degrees. Diffraction by the grating angularly disperses the different spectral frequencies of the input pulse along the x axis. The pulse propagated along the z axis. The grating was placed in the front focal plane of a 20-cm focal length cylindrical lens with curvature along the x axis. The lens collimated and focused the spatially separated frequency components onto a transparent glass mask.

The mask included 28 separate transmitting horizontal one-dimensional filtering regions spaced over a 9 mm×7 mm aperture on a fused silica substrate. Each filtering region consisted of a repeating pseudorandom sequence of binary thicknesses. The mask thus filtered the phases of the dispersed spectral frequencies. Each filtering region on the mask corresponded to a slightly different temporal profile. The optical field in the focal plane was incident over approximately eleven different horizontal, one-dimensional filtering regions. The optical field was spatially filtered by attenuating bars between the one-dimensional filtering regions along the y axis which blocked the incident spatial frequencies.

The mask's filtering regions were placed in the back focal plane of the cylindrical lens. As a result, the spatial profile of the optical field in the mask plane was not tightly focused along the y axis.

A subsequent 15-cm spherical lens and 1200-line/mm anti-parallel grating were used to recombine the filtered spectral frequencies along the x axis. The spherical lens was placed with the mask in its front focal plane and the second grating in its back focal plane. Shadow imaging was performed by placing another 15-cm spherical lens a focal distance away from the second diffraction grating.

A KTP doubling crystal for cross correlation was placed in the front focal plane of the second spherical lens. A variably delayed reference pulse was then spatially and temporally overlapped with the output waveform on the doubling crystal to perform the cross correlation. Frequency doubled light arising from the spatial overlap of the reference pulse and the output waveform was then imaged onto a CCD camera using a 10-cm spherical lens. Camera images were recorded as a function of the delay of the reference pulse, thus providing both temporal and spatial information.

The output optical waveform consisted of a spatially separated series of 11 175-micron spots spaced along the y axis. The temporal profile of each spot was a series of time-dependent pulses. The output waveform was both temporally and spatially coherent.

FIGS. 5A–E show the camera image of the frequency doubled light from the KTP crystal at 0 fs, −170 fs, −1300 fs, −1370 fs, and −1430 fs time delay between the reference pulse and the output waveform. The contours in the figure indicate the optical intensity of the pulses at different times; a relatively high number of contours indicates an relatively high optical intensity. For each figure, the number of contour lines is scaled to the maximum intensity of the output waveform. At zero time delay (FIG. 5A) eleven separate spots are visible. Ten of the spots include temporal profiles consisting of pulse sequences with repetition rates ranging from 2.00 to 2.41 THz. The temporal profile of the second spot from the top consists of only a single time-delayed pulse. This single pulse was not shaped by the mask, and thus had a temporal profile similar to that of the input pulse and a relatively high optical intensity. The pulse was also slightly displaced from zero time delay. Its optical intensity is thus measured at 0 fs (FIG. 5A) and −170 fs (FIG. 5B). At a 170-fs time delay (FIG. 5B) only the spot associated with the single pulse produces a signal. At larger time delays the pulses in the different pulse trains are no longer temporally coincident. FIGS. 5C–5E show that the spots shift as the time delay is increased. This behavior is expected for pulse trains of varying repetition rates.

Still other embodiments are within the scope of the following claims.

What is claimed is:

1. A method for shaping a time-dependent input optical pulse to generate a time-dependent output optical waveform with a spatial profile comprising multiple, spatially coherent regions, each having a temporal profile comprising at least one time-dependent pulse, said method comprising:

dispersing spectral frequencies of the input optical pulse along a first axis to form a spectral frequency profile;

focussing the spectral frequency profile in an image plane to form a two-dimensional optical field comprising both phase and amplitude components;

filtering at least one of the amplitude, phase, or phase and amplitude components of the two-dimensional optical field with a mask comprising a two-dimensional array of pixels;

recombining the dispersed spectral frequencies of the spectral frequency profile; and, imaging the filtered two-dimensional optical field to generate the time-dependent output optical waveform.

2. The method of claim 1, wherein said focussing includes focussing the spectral frequencies of the spectral frequency profile along a second axis.

3. The method of claim 2, wherein the second axis is roughly orthogonal to the first axis.

4. The method of claim 2, wherein said focussing includes focussing the spectral frequencies of the spectral frequency profile with a first lens.

5. The method of claim 4, wherein the first lens used during said focussing is a cylindrical lens.

6. The method of claim 1, wherein said filtering comprises transmitting the two-dimensional optical field through the mask comprising the two-dimensional array of pixels.

7. The method of claim 1, wherein said filtering comprises reflecting the two-dimensional optical field from the mask comprising the two-dimensional array of pixels.

8. The method of claim 1, wherein at least one of the amplitude, phase, or phase and amplitude components of the two-dimensional optical field are filtered by an optical element comprised by each pixel in the two-dimensional array of pixels.

9. The method of claim 8, wherein the optical element is a liquid crystal.

10. The method of claim 1, wherein said recombining comprises imaging the filtered two-dimensional optical field on a diffraction grating with a second lens, and then diffracting the filtered two-dimensional optical field with the diffraction grating.

11. The method of claim 1, wherein said filtering comprises imparting a pattern on said two-dimensional optical field.

12. The method of claim 11, wherein said imaging comprises imaging the filtered two-dimensional optical field so that its spatial profile is an image of the pattern.

13. The method of claim 12, wherein said imaging comprises collecting the filtered two-dimensional optical field with a third lens having a focal length, and then imaging the two-dimensional optical field in a sample plane located one focal length away from the lens.

14. The method of claim 11, wherein said imaging comprises imaging the filtered two-dimensional optical field so that its spatial profile is a Fourier transform of the pattern.

15. The method of claim 14, wherein said imaging comprises collecting the filtered two-dimensional optical field with a third lens having a focal length, and then imaging the two-dimensional optical field in a sample plane located two focal lengths away from the lens.

16. An optical waveform made using the method of claim 1, wherein said waveform comprises multiple regions, wherein each of said regions is spatially isolated, spatially coherent with other regions in the waveform, and comprises a separate temporal profile comprising at least one time-dependent pulse.

17. The method of claim 16, wherein each time-dependent pulse in said optical waveform has a duration of $1 \times 10^{-12}$ second or less.

18. A pulse-shaping device for shaping a time-dependent input optical pulse into a time-dependent output optical waveform with a spatial profile comprising separate, spatially coherent regions, each having a separate temporal profile comprising at least one time-dependent pulse, said device comprising:

a first optical component configured to disperse spectral frequencies of the input pulse along a first axis to form a spectral frequency profile;

a focussing optic aligned to receive the spectral frequency profile dispersed from the first optical component and then focus the spectral frequency profile in an image plane, thereby forming a two-dimensional optical field comprising phase, amplitude, or phase and amplitude components;

a mask comprising a two-dimensional array of pixels, wherein said array of pixels is aligned to receive the two-dimensional optical field, and each of said pixels comprises an optical element for filtering either the amplitude, phase, or phase and amplitude components of the two-dimensional optical field;

a second optical component aligned to receive the spectral frequency profile and configured to recombine the dispersed spectral frequencies of the spectral frequency profile; and, an imaging system for imaging the filtered two-dimensional optical field on a sample plane to generate the output optical waveform.

19. The device of claim 18, wherein said focussing optic is a cylindrical lens.

20. The device of claim 18, wherein said imaging system comprises a lens having a focal length, said lens being configured to image the two-dimensional optical field in a sample plane located one focal length away from the lens.

21. The device of claim 18, wherein said imaging system comprises a lens having a focal length, said lens being configured to image the two-dimensional optical field in a sample plane located two focal lengths away from the lens.

* * * * *